United States Patent [19]

Yoshino et al.

[11] Patent Number: 5,058,009
[45] Date of Patent: Oct. 15, 1991

[54] FINANCIAL CALCULATOR FOR CALCULATING, GRAPHICALLY DISPLAYING AND CONFIRMING RESULTS OF LOAN AMORTIZATION CALCULATION

[75] Inventors: Hiroyuki Yoshino, Fussa; Yoshinori Tomidokoro, Higashimurayama, both of Japan

[73] Assignee: Casio Computer Co., Ltd., Tokyo, Japan

[21] Appl. No.: 321,975

[22] Filed: Mar. 9, 1989

[30] Foreign Application Priority Data

Mar. 15, 1988 [JP] Japan .................. 63-33809[U]
Mar. 15, 1988 [JP] Japan .................. 63-33810[U]

[51] Int. Cl.$^5$ ........................................... G06F 15/42
[52] U.S. Cl. ................................. 364/408; 364/225; 364/918
[58] Field of Search ............... 364/401, 408, 918, 225

[56] References Cited

U.S. PATENT DOCUMENTS 3,863,060  1/1975  Rode et al. .

OTHER PUBLICATIONS

"GMAC Mortgage Amortization Schedule".
"Ficalcs", Computer Language, vol. 4, No. 1, p. 83, Jan. 1987, Tim Parker.
"HP Compound Interest and Loan Amortization", product literature, AN83–003530.

Primary Examiner—Gail O. Hays
Attorney, Agent, or Firm—Frishauf, Holtz, Goodman & Woodward

[57] ABSTRACT

A financial calculator executes calculations on amortization of a loan, and depreciation, and calculation results are displayed on a display unit as a graphic representation in view of time lapses. To confirm the calculation results, the resultant values are displayed and also the portions of the displayed graph corresponding to the resultant values are displayed in a specific form by which meanings of these calculated values can be efficiently grasped.

8 Claims, 5 Drawing Sheets

FINANCIAL CALCULATOR FOR CALCULATING, GRAPHICALLY DISPLAYING AND CONFIRMING RESULTS OF LOAN AMORTIZATION CALCULATION

BACKGROUND OF THE INVENTION

1. Field of the Invention

The present invention relates to a financial calculator having a graphic representation function capable of displaying a flow of financial data obtained by proper financial calculations in a graphic representation.

2. Description of the Related Art

Recently, compact electronic calculators are capable of calculating various financial calculations. These conventional calculators can calculate, for instance, calculations on amortization of loan and depreciation.

When calculating the amortization of loan, the below-mentioned equations are performed for the data entry:

$$INTj = |PVj-1 \times i| RND \times (PMT's\ sign) \quad (1)$$

$$PRNj = PMT - INTj \quad (2)$$

$$PVj = PVj\text{-}1 - PRNj \quad (3)$$

where the symbol "INTj" indicates the interest of the j-th payment; the symbol "PRNj" represents the principal of the j-th payment; the symbol "PVj" represents the amount of remaining payment at the j-th payment; the symbol "j" indicates the number of j-th payment; the symbol "i" is an interest; the symbol "PMT" denotes an amount of one payment; and the sign of "PMT" is to discriminate a debt from a credit.

However, the above-described conventional calculators merely display the calculation results as the numerical data, so that variations on the ratio of the interests to the principals for the payments can be hardly visually grasped in case that the total number of the payment is increased.

If such variations are wanted to be visually grasped, an operator must first calculate either the principals or interests for each of the payments and then must plots points on a graph. This causes extremely cumbersome workload to this operator.

In other words, although analysis is required in the calculation results with respect to the time lapse in the financial calculation, the conventional financial calculators merely represent the calculation result with respect to one financial condition, not over the entire financial condition.

SUMMARY OF THE INVENTION

It is therefore an object of the invention to provide a financial calculator capable of graphically and efficiently representing calculation results in the financial calculation.

A financial calculator comprising:

first key input means for entering data on a financial calculation;

second key input means for designating a sort of said financial calculation;

third key input means for designating one of calculation results;

memory means for storing various financial data input from said first key input means;

calculation means for executing the financial calculation designated by said second key input means based upon the financial data which has been stored into said memory means;

graph forming means for plotting said calculation results at time instants during time lapse so as to form a graphic representation;

display means for displaying said graphic representation plotted by said graph forming means; and, confirmation means for displaying one of said calculation results designated by said third key input means on said displaying means and for displaying a plotting point corresponding to said designated calculation result in a specific form.

BRIEF DESCRIPTION OF THE DRAWINGS

For a better understanding of the various merits of the invention, reference is made to the following description in conjunction with the accompanying drawings, in which:

FIG. 6 is a flowchart for representing a trace functioning operation of a graph display for the depreciation financial calculation; and, FIGS. 7A to 7C illustrate various key operations of the depreciation financial calculation and display conditions thereof.

DETAILED DESCRIPTION OF THE PREFERRED EMBODIMENTS

Arrangements of Financial Calculator

Figure 1:
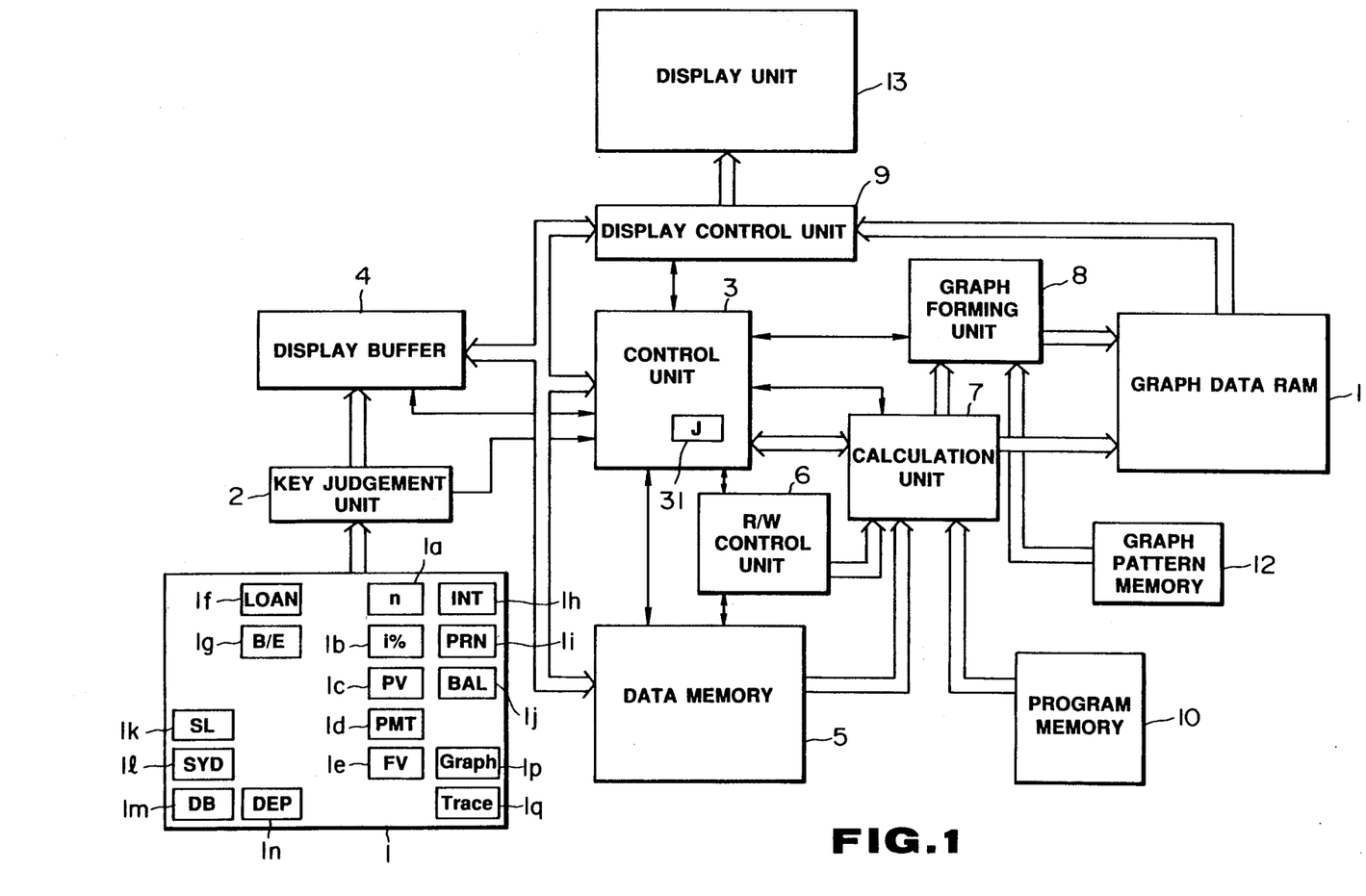
FIG. 1 is a functional block diagram of a financial calculator according to the invention.

FIG. 1 shows a functional block diagram of a compact financial calculator, according to the invention, capable of executing both amortization of a loan and depreciation.

As illustrated in FIG. 1, a key input unit 1 includes a numerical value key (not shown in detail) for inputting numerical data; and an "n" key 1a, an "i%" key 1b, "PV" key 1c, "PMT" key 1d, and "FV" key 1e for designating a sort of data. This key input unit 1 further includes a "loan" key 1f for setting a loan amortization calculation mode with respect to the amortization of the loan; a "B/E" key 1g for designating a begin/end of term for a payment; an "INT" key 1h for designating a calculation of an interest on each payment; a "PRN" key 1i for designating a calculation of a principal on each payment; and, a "BAL" key 1j for designating an amount of a remaining principal. With regard to a depreciation calculation, this key input unit 1 includes a "SL" key 1k for designating a straight-line method thereof; a "SYD" key 1l for designating a sum-of-the-year's digit method thereof, a "DB" key 1m for designating a declining balance method thereof; and a "DEP" key 1n for designating a depreciation calculation according to the above-described methods. In addition, the key input unit 1 includes a "Graph" key 1p for displaying a result of a financial calculation as a graphic representation, and a "Trace" key 1q for tracing a value on the graphic representation.

Key entered data of the key input unit 1 are supplied to a key judgment unit 2. The key judgment unit 2 has functions to judge the input data, supply execution instruction data to a control unit 3, and furnish numeral and character data to a display buffer 4.

The control unit 3 is constructed of a read only memory (ROM), and preciously stores a program to control each of circuits of the financial calculator. In this case, the control unit 3 supplies a control instruction to the above-described display buffer 4, a data memory 5, a R/W control unit 6, a calculation unit 7, a graph forming unit 8, and a display control unit 9. The control unit 3 further includes a counter 31 for controlling a sequence of data.

The numeral and character data stored into the display buffer 4 are stored into a data memory 5. The data memory 5 stores first data relating to loan amortization entered by the key input unit 1, such as payment number data (n), interest data (i%), principal data (PV), payment data (PMT), and also second data relating to depreciation such as purchase value data (PV), remaining book value data (FV), useful life time data (n) and declining balance factor (i%). The R(read)/W(write) control unit 6 controls data writing/reading operations of the data memory 5. The calculation unit 7 execute either loan amortization calculation or depreciation calculation while accessing the data memory 5 in accordance with the program stored in the program memory 5, and furthermore supplies a calculation result to the control unit 3, graph forming unit 8 and a graph data RAM 11. The program memory 10 stores a program for calculating the loan amortization, and a program for calculating the depreciation.

The above-described graph forming unit 8 forms graphic-represented data by utilizing the calculation results of the calculation unit 7, and X-axis and Y-axis patterns stored in the graph pattern memory 12, and thereafter supplies the graph data to the graph data RAM 11. The graph RAM 11 corresponds to a dot matrix of a display unit 13 (will be described later), and stores a display content as "1" and "0" based upon the data supplied from the calculation unit 7 and graph forming unit 8. Then, the memory content of this graph RAM 11 is supplied to the display control unit 9. The display control unit 9 drives the display unit 13. In this display unit 13, there is employed a liquid crystal display unit (LCD) having a matrix of 96×64 dots.

Calculation on Loan Amortization

A description will now be made of calculating loan amortization by the financial calculator comprising the above-described circuit arrangement.

Figure 2:
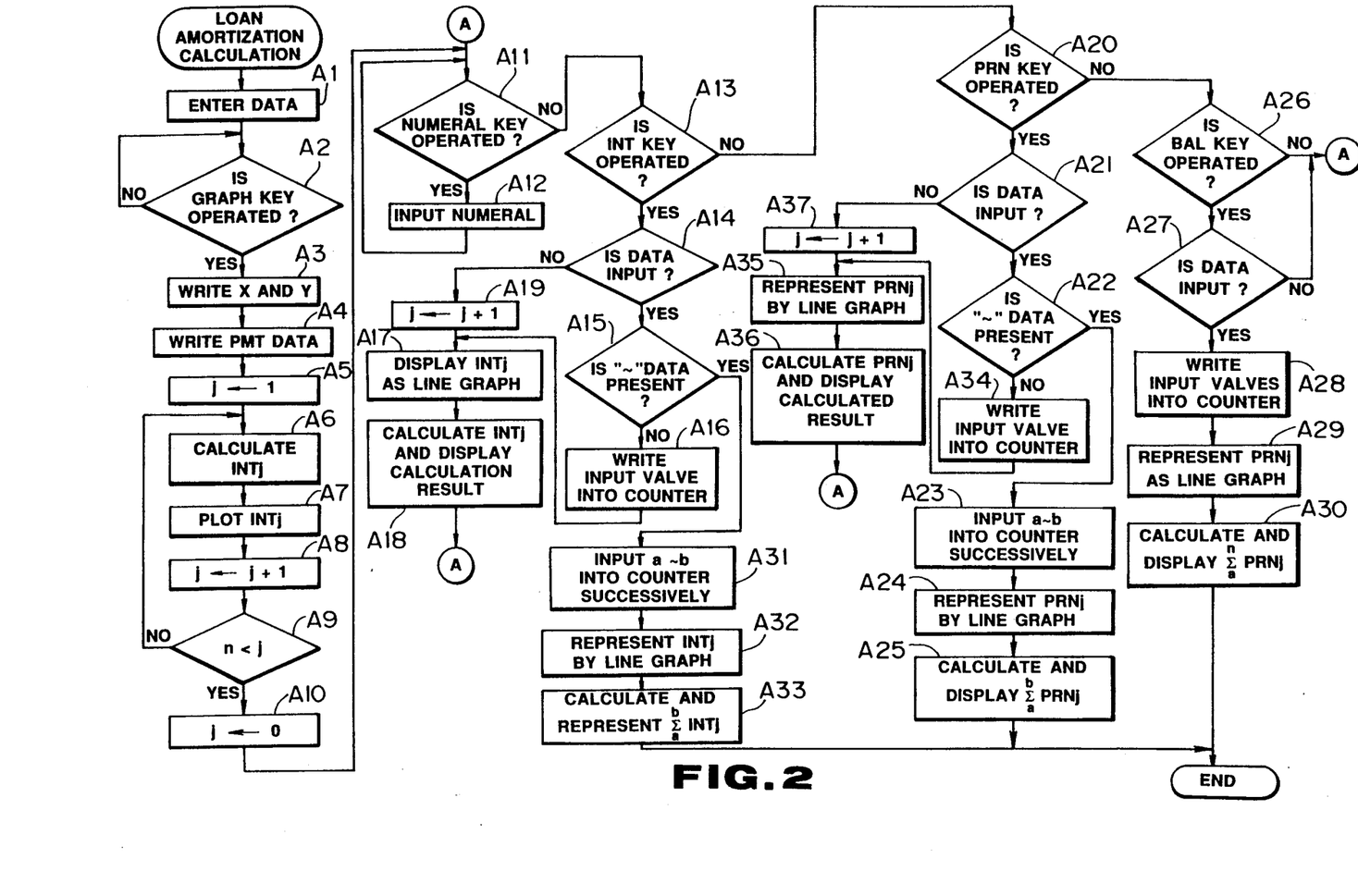
FIG. 2 is a flowchart for representing operations of amortization of a loan according to a financial calculation effected in the financial calculator shown in FIG. 1.
Figure 3A:
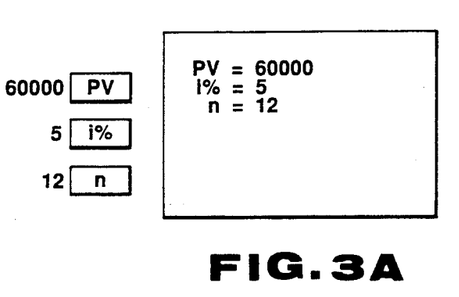
FIGS. 3A to 3F represent various key operations for the amortization of a loan and display screen conditions related thereto.

First, when the "loan" key 1f of the key input unit 1 is manipulated, the loan amortization calculation mode is set and the loan amortization calculation as defined by a flowchart shown in FIG. 2 is executed. It should be noted that an end payment is decided unless the "B/E" key 1g is operated. Under this condition, the data necessary for the loan amortization calculation are entered at a step A1. In this case, as illustrated in FIG. 3A, "60,000" is entered as the principal "PV", "5" is input as the interest "i%", and "12" is input as the number of payment by the key input unit 1. These entered data are stored in the data memory 5, and simultaneously displayed in the display unit 13 shown in FIG. 3A.

Then, when the "Graph" key 1p is operated in the key input unit 1, the process at the step A2 is advanced to a step A3 (Yes). That is, the graph forming operation will now be executed. It should be understood that this display condition is maintained until the "Graph" key 1p is operated.

During the graph forming operation, vertical and horizontal axes (i.e., X and Y axes) patterns are written in the graph data RAM 11 at the step A3, and displayed on the display unit 13. In the preferred embodiment, the X and Y axis patterns are read out from the graph pattern memory 12. Then, the data process is advanced to a step A4. In the step A4, the payment amounts "PMT" at the respective payments are written. This payment amounts "PMT" at the respective payments are constant, the graph data on "y =PMT" is written in the graph data RAM 11, and displayed on the display unit 13.

Then, the data process is advanced to a step A5. In this step A5, the content of the counter 31 in the control unit 3 is set to "1". Then, in the next step A6, the interest INT1 of the first payment is calculated, and the resultant data is written into the graph data RAM 11 as the plot data in the subsequent step A7. This plot data is displayed on the display unit 13. The calculation on the interest INT1 is executed based on the program of the loan amortization previously stored in the program memory 10 under the control of the calculation unit 7.

Subsequently, the graph forming process is advanced to a step A8, in which the content of the counter 31 is incremented by 1, and thereafter a judgment is made on j>n at the next step A9. In this case, the number "n" of the payment is equal to 12, then the process is returned to the step A6. Then j=2, namely the interest INT2 of the second payment is calculated. This calculation result is written into the graph data RAM 11 as plotting data and also displayed on the display unit 13.

Thereafter, similarly, while the content of the j-counter 31 is incremented by 1 at a step A8, another interest INTj of the third payment and the remaining interests INTj of the subsequent payment are calculated at the previous step A6. The resultant data are displayed as the plotting data on the display unit 13. The display condition of the display unit 13 under this condition is illustrated in FIG. 3B.

After the calculation on the interests of the payments until 12th payment has been calculated, if a judgment on j>n at the step A9 is made YES, the content of the j-counter 31 is set to zero at a step A10 and then the graph forming process is completed.

Figure 3B:
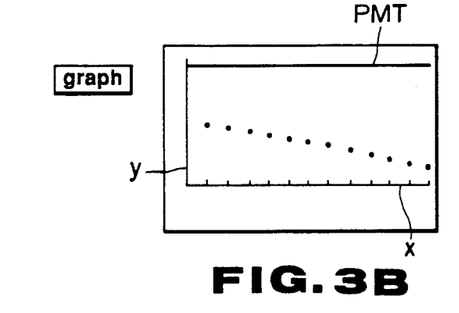
Figure 3C:
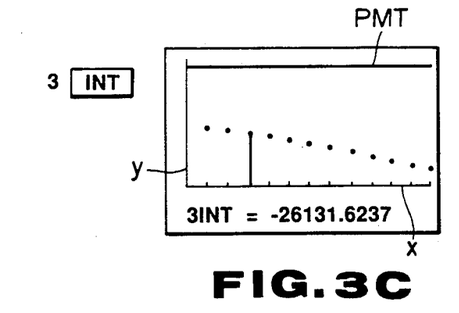

In case that, for instance, the value of the interest INTj of the third payment is confirmed from this displayed graph as shown in FIG. 3B, "3" is entered by the numeral key of the key input unit 1 and subsequently the "INT" key 1h is operated (see FIG. 3C). Then, the numeral is entered (i.e., YES) in a step A11 due to the entry of the numeral "3", so that the entered value is stored into the data memory 5 at a step A12. Thereafter, when the INT key 1h is operated to initiate an interest information mode, the judgment at the step A11 is NO and another judgment at the step A13 is YES, so that the process is advanced to the next step A14. In this step A14, a judgment is made whether or not the numeral data has been stored into the data memory 5. Since "3" has been entered into this memory in this case, the judgment result becomes YES and then the process is advanced to the next step A15. In this step A15, another judgment is made whether or not "~" data is present in the input data. In this case, the judgment result if "NO" and thus the process is advanced to a step A16. In this step A16, the input value, namely numeral "3" is written into the counter 31 and thereafter the process is advanced to a step A17.

In this step A17, the interest INT3 of the third payment is displayed as a line-segment pattern. The line-segment pattern in this case is represented by a vertical line directed from the plotting position of j=3 toward the X axis. Then, at the next step A18, the interest INT3 of the third payment is calculated. The resultant value is displayed on the display unit 13. The display condition in this case is represented in FIG. 3C.

Figure 3D:
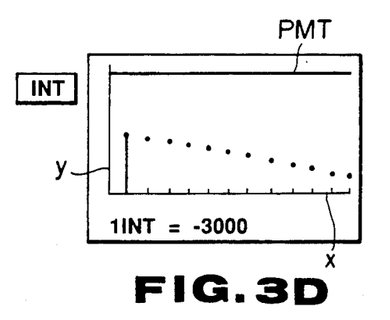

When, on the other hand, no numeral is entered and only the INT key 1h is operated, the judgment result becomes NO in the step A14. Then, j=1 is set in the step A19. Thereafter, the process is advanced to a step A17 at which the interest INT1 of the first payment is displayed as a line-segment pattern. Subsequently, in a step A18, the interest INT1 of the payment under j=1 is calculated and the calculation result is displayed on the display unit 13. The display condition of this calculation result is displayed in FIG. 3D.

Moreover, when only the INT key 1h is operated under this condition, the judgment results in the step A11, step A13 and step A14 are "NO", "YES" and "NO" respectively. As a result, the process is advanced to a step A19. Then, the content of the counter 31 is incremented by 1, and the process is advanced to a step A17. As a consequence, the interest INT2 of the second payment (j=2) is displayed as the line-segment pattern. Similarly, when only the INT key 1h is operated, the interest portions INTj of the payments after third payment are represented as the line-segments, and subsequently, the interest portions INTj of the payments are calculated and displayed on the display unit 13 in the step A18.

Confirmation on Amount With Interest Added

A description will now be made on confirmation on an amount with an interest added from the number of "a" to the number of "b". In this case, when the numeral key in the key input unit 1 is operated to enter "3" "~" "5", and subsequently the PRN key 1i is operated to initiate a principal information mode, the judgment defined in the previous step A11 becomes "YES". Accordingly, the numeral is input in the step A12 and the process is returned to a step A11. Thereafter, when the PRN key 1i is operated, then the judgments defined in the step A11, A13 and A20 are "NO", "NO" and "YES" respectively, so that the process is advanced to a step A21. In this step A21, since the input data "3" "~" "5" are entered, a judgment result becomes YES and then the process is advanced to a next step A22. In this step A22, a judgment is made whether or not the "~" data is present in the input data. In this case, the judgment result becomes YES, and thereafter the process is advanced to the subsequent step A23. In this step A23, the input value, i.e., the numerals 3 to 5 are sequentially written into the counter 31.

Figure 3E:
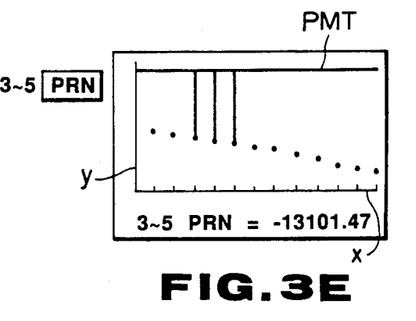

In a next step A24, the total amount of the principals PRN3 to PRN5 in the third to fifth payments are displayed by the line-segment patterns. These line-segment patterns represent vertical lines directed from the respective plotting positions of j=3 to 5 toward the line of PMT. Then, in the step A25, j=3 to 5, that is, the total amount (ΣPRNj) of the principals PRN 3 to PRN5 in the third to fifth payments is calculated and the calculation result is displayed in the display unit 13. FIG. 3E illustrates the display condition of the display unit 13 in this case.

Confirmation On Remaining Principal Amount

Confirmation on a remaining principal amount will now be described at any payments.

Assuming that the remaining amount at the fifth payment is confirmed in this case, the numeral key of the key input unit 1 is operated to enter "5". Subsequently, the BAL key 1j is operated. As a consequence, since the judgment result defined in the step A11 becomes YES by operating the numeral key of "5", the numeral is entered in the step A12 and the process is returned to the previous step A11. Then, if the BAL key 1j is operated, the judgment results defined in the steps A11, A13 and A20 are NO respectively, and also the judgment result defined in the step A26 becomes YES, so that the process is advanced to a step A27. In this step A27, since the entered data is "5" and the judgment result is YES, then the process is advanced to a next step A28. In the step A28, the input values, i.e., the numerals from 5 to "n" are sequentially written into the j-counter 31 and the process is advanced to the subsequent step A29.

Figure 3F:
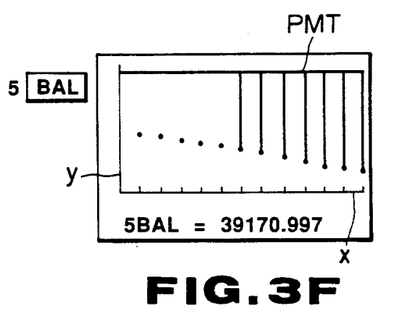

In the step A29, the total amount of the principals PRN5 to PRNn in the fifth payment and succeeding payments is represented by the line-segment patterns. These line-segment patterns are represented by vertical lines directed from the respective plotting positions of j=5 and more toward the PMT line. Thereafter, in a next step A30, the total amount of the principals PRN5 to PRNn in the fifth payment and the subsequent payments, i.e., $$\sum_{5}^{n} PRNj$$

is calculated and the calculation result is displayed on the display unit 13. FIG. 3F represents the display condition of the display unit 13.

It should be noted that when a calculation is made on the total amount of the paid interests from the number "a" to the number "b" according to the above-described interest calculation, the numeral key of the key input unit 1 is operated to enter "a" "~" "b" and subsequently the INT key 1h is operated. Then, the data "a" "~" "b"]are entered in the step A11 and step A12, and then the process is advanced to the steps A14 and A15 by operating the INT key 1h. In the step A15, a judgment is made whether or not the "~" data is present in the input data. In this case, since the judgment result is "Yes", the process is advanced to step A31. In this step A31, the input value, namely the numerals "a" to "b" are successively written into the J-counter 31 and the process is advanced to a step A32. In this step A32, the interest amounts INTa to INTb of a-th to b-th payments are represented as the line-segment patterns. These line-segment patterns illustrate vertical lines directed from the respective plotting positions of j="a" to "b" toward the X axis. Then, in the step A33, the total amount $$\left( \sum_{a}^{b} PRNj \right)$$

of the interests INTa to INTb in a-th to b-th payments is calculated and the calculation result is displayed in the display unit 13.

If the principal amount PRNj of m-th payments is wished to be displayed, the numeral "m" is input by the numeral key of the key input unit 1 and subsequently the PRN key 1i is manipulated. Then, in the steps A11 and A12, the numeral "m" is entered and the process is advanced to the step A21 by operating the PRN key 1i. In this step A21, the judgment result thereof becomes YES since the data is input so that the process is advanced to the next step A22. In this step A22, a judgment is made whether or not the "~" data is present in the input data. In this case, since this judgment result is "NO", the process is advanced to a step A34. In this step A34, the input value, namely the numeral "m" is written into the counter 31, and the process is advanced to the next step A35. In this step A35, the principal amount PRNm of the m-th payment is represented by the line-segment pattern. This line-segment pattern is represented by a vertical line directed from the plotting value of j=m toward the PMT line. Thereafter, the principal amount PRNm of the m-th payment is calculated, and the calculation result is displayed in the display unit 13. Next, when only the PRN key 1i is operated in the key input unit 1 under this condition, the process is advanced to a step S37. In this step, the content of the counter 31 is increased by 1. As a result, in the nextstep A35, the principal amount PRNm+1 of the (m+1)-th payment is represented by the line-segment pattern, and then the principal amount PRNm+1 of the (j=m+1) payment is calculated and the calculation result is displayed on the display unit 13. Similarly, when only the PRN key 1i is operated, the principal amounts PRNj of the (m+1)-th payment and the succeeding payments are displayed as the line-segment patterns, and the principal amount PRNj of the payments are calculated and the calculation result is displayed on the display unit 13.

In the above-described remaining principal calculation at the payment, when only the BAL key 1j is operated under the condition that no numeral input is made, the judgment result defined in the step A26 becomes YES and then the process is advanced to a step A27. In this step A27, since the judgment result becomes "NO", the process is returned to the step A11 and thus is brought into the waiting condition for the key input.

As seen from the foregoing, according to the invention, entering the various data required for calculating the amortization of the loan enables various calculations at the desired m-th payment, e.g., the interest amount, principal amount, remaining principals, total interest amount for "a" to "b"-th payments, or total principal to be calculated. Also, these calculation results can be simply displayed in a graphic representation.

Calculation On Depreciation

A description will now be made on a calculation of depreciation, utilizing a financial calculator according to the present invention.

As the depreciation method, a program relating to a straight-line method, a sum-of-the-year's digits method, and a declining balance method has been previously stored in a program memory 10 shown in FIG. 1.

Calculation on the sum-of-the-year's digits method will now be described.

First, the sum-of-the-year's digits method will be summarized. A depreciation value "Depj" is calculated by the following equation:

$$Dep_j = [(n-j+1)/total\ years] \times (PV-FV) \quad (1),$$

where the symbol "PV" indicates a purchase value, the symbol "FV" represents a remaining book value, and the symbol "n" denotes an useful life indicated by number of years (an integer).

In addition, the total number of years is expressed by the following formula:

The total number of years $= (1+2+\cdots+n) = (n+1)n/2$.

As a result, the depreciation values every year "Depj" can be obtained by changing the value of "j" in equation (1) from 1 to "n(an integer)".

Figure 4:
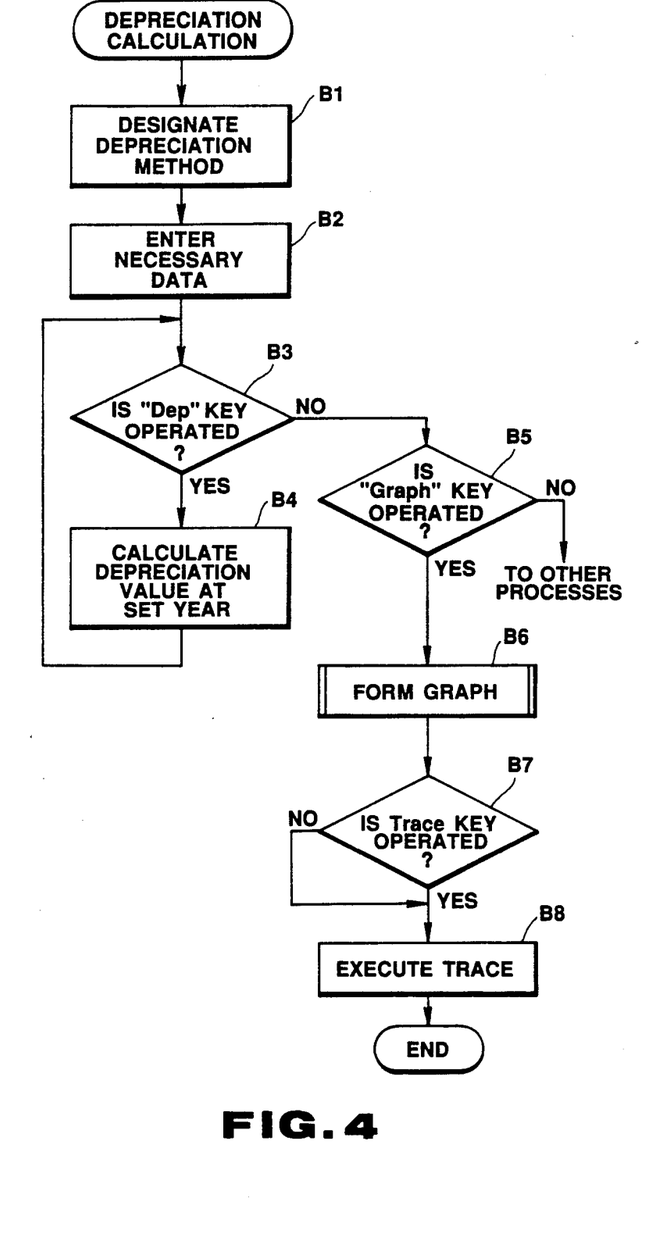
FIG. 4 is a flowchart for representing operations of depreciation according to another financial calculation performed in the financial calculator shown in FIG. 1.

The depreciation calculation is operated in accordance with a flowchart shown in FIG. 4.

Figures 6, 7A, 7B, 7C:
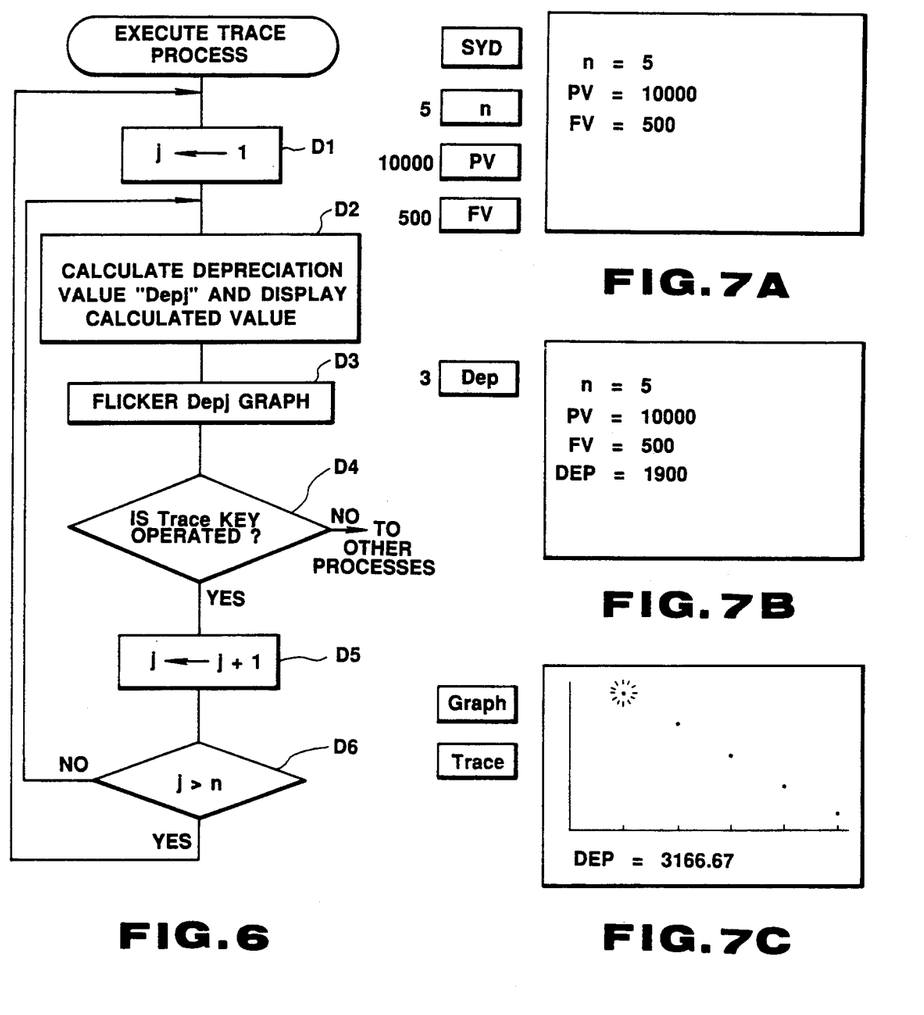

In the flowchart of FIG. 4, the SYD key 1l of the key input unit 1 is first operated at a step B1, so as to designate the sum-of-the-year's digits method as the depreciation calculation. Then, data required to execute this depreciation method are entered at a step B2. In this case, as illustrated in FIG. 7A, "5" is entered as the useful life "n"; "10000" is input as the purchase value "PV"; "500" is entered as the remaining book value "FV" by way of the key input unit 1. These entered data are stored in the data memory 5 and then displayed on the display unit 13, as illustrated in FIG. 7a.

Thereafter, "3" is set by the key input unit 1 and a "Dep" key 1n is operated. Then, a judgment result defined in a step B3 is "YES" and therefore the process is advanced to a step B4. In this step B4, the set year and depreciation value at the third year are calculated in accordance with the above-described program. In this case, the depreciation value is calculated in the calculation unit 7 based upon the program relating to the sum-of-the-year's digits method stored in the program memory 10 while communicating the data with the data memory 5. Then, the calculation result is supplied from the control unit 3 to the display unit 13 for the display purpose. The display condition of the display unit 13 under this condition is represented as FIG. 7B.

Subsequently, a "Graph" key 1p in the key input unit 1 is operated. A judgment result defined in a step B5 is "YES", then the process is advanced to a step B6. At this step B6, a graph is formed. It should be noted that if no "Graph" key 1p is operated, the process is advanced to other processes.

Graph Forming

Figure 5:
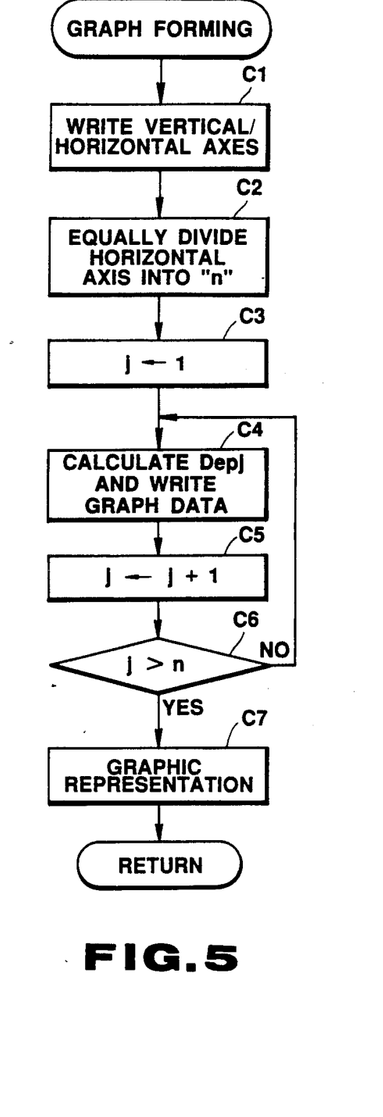
FIG. 5 is a flowchart for explaining a graph forming operation for the depreciation financial calculation.

To form a graph as defined in the above-described step B6, another flowchart shown in FIG. 5 is executed.

In a step C1 of this flowchart, vertical and horizontal axes patterns of this graph are written into the graph data RAM 11 shown in FIG. 1. These axes patterns are read from the graph pattern memory 12. Then the process is advanced to a step C2. In this step C2, the horizontal axis of the graph is equally divided into "n" by the input data of the useful life "n". In this case, since the data on the useful life "n" is equal to "5" as previously explained, the horizontal axis of the graph is equally divided into 5 portions. Further, the scale data is written into the graph data RAM 11.

Then, the process is advanced to the next step C3. In this step C3, "j" of the counter 31 in the control unit 3 shown in FIG. 1 is set to "1". Thereafter, in the subsequent step C4, the depreciation value D epj at the first year is calculated. The resultant value is written into the coordinate system of the graph data RAM 11 as the plotting data. The above-described depreciation value calculation is carried out based upon the program on the sum-of-the-year's digits method, which is stored in the program memory 10 by the calculation unit 7.

Subsequently, the process is advanced to a step C5, at which "j" is incremented by one. Then, in the next step C6, a judgment is made on j>n. In this embodiment, since the useful life year "n" is selected to be 5 and the judgment result is "NO", the process is returned to a step C4. Thus, a depreciation value "D epj" at the second year is calculated. The calculation result is written into the graph data RAM 11 as the plotting data.

Similarly, while j is increased by +1 in a step C5 so as to calculate, another depreciation value "D epj" at the third year is calculated in the step C4, and also the calculation result is written into the graph data RAM 11 as the plotting data. Then, after the depreciation values form the first year to the fifth year have been calculated, if a judgment on "j>n" defined in a step C6 becomes "YES", the contents of the graph data RAM 11 are supplied to the display control unit 9 in a step C7 and displayed in the display unit 13. The display condition of the display unit 13 under this condition is shown in FIG. 7C.

Thereafter, the process is returned to the flowchart shown in FIG. 4.

In this FIG. 4, the process is advanced to a subsequent step B7, where a judgment is made whether or not a "Trace" key 1q is operated. If no "Trace" key 1q is operated ("NO"), the process is accomplished. To the contrary, if the judgment result is YES, the control process is advanced to a next step B8, where the trace process is executed.

Trace Process

The trace process defined in this step B8 is executed in another flowchart shown in FIG. 6. In a first step D1, "j" of the counter 31 in the control unit 3 shown in FIG. 1 is set to "1". Then, a subsequent step D2, a depreciation value "D epj" at the first year is calculated and the calculation result is displayed in the display unit 13. Simultaneously, a graph representing the depreciation value "D epj" at the first year is displayed in a flicker form. The display condition of the display unit 13 under this condition is shown in FIG. 7C.

Under this condition, when the "Trace" key 1q is again operated in the key input unit 1, a judgment result defined in a step D4 is made YES and thus the process is advanced to a next step D5. To the contrary, if no "Trace" key 1q is operated, the process is advanced to other processes. In the step D5, "j" of the counter 31 is incremented by 1, and subsequently, another judgment "j>n" is executed in a next step D6. In this case, since the useful year's "n" is selected to be 5 and therefore the judgment result is "NO", the process is returned to the step D2. Then, the depreciation value "D epj" at the second year is calculated and the calculation result is displayed in the display unit 13. Simultaneously, the graph representing the depreciation value "D epj" at the second year defined at the step D3 is flickered.

Subsequently, while "j" of the counter 31 is incremented by 1 similarly, the depreciation values "D epj" at the third and subsequent years are calculated and the calculation results are displayed at the display unit 13. After the depreciation values from the first to fifth years are calculated, if the judgment on "j>n" defined in the step D6 becomes "YES", then the process is returned to the step D1. As a consequence, "j" of the counter 31 is again set to "1", and the calculation amount is displayed on the display unit 13. At the same time, the graph representing the depreciation value "D epj" at the first year defined in the step D3 is flickered.

While has been described in detail, the depreciation values at each year can be calculated, according to the invention, based upon the prepared depreciation calculating program by entering the necessary data, and also these depreciation values can be readily displayed in a graphic representation.

What is claimed is:

1. A financial calculator having a dot matrix-type liquid-crystal display means, comprising:

first key input means for entering financial data including principal data, interest data and number of payments data related to calculation of amortization of a loan;

memory means for storing said financial data input through said first key input means;

calculation means for performing calculation of amortization of a loan by calculating an amount of each payment on the basis of said financial data stored in said memory means;

graph forming means for plotting on said display means the amount of each payment and the interest payment amount included in each payment calculated by said calculation means, wherein the amounts are represented on a vertical axis and time is represented on a horizontal axis;

second key input means for entering numeral data which designates at least one payment;

third key input means for designating an interest information mode;

fourth key input means for designating a principal information mode;

confirmation means including:

means responsive to said third key input means for displaying on said display means a numerical representation and graphical representation o the interest payment amount of the at least one payment designated by said second key input means; and means responsive to said fourth key input means for displaying on said display means a numerical representation and graphical representation of a principal payment amount of the at least one payment designated by said second key input means; and judging means for judging whether or not numeral data is entered from said second key input means before said third key input means or said fourth key input means is operated; and wherein said confirmation means further includes means for designating a first payment when said judging means judges that there is no numeral data entered from said second input means.

2. The financial calculator of claim 1, wherein said confirmation means further includes:

means for advancing the designation of a payment to the next one when said third key input means or said fourth key input means is further operated after a payment is designated by said designating means.

3. A financial calculator as claimed in claim 1, wherein:
   means responsive to said third key input means further includes means for representing a vertical line directed from a plotting point related to the interest payment amount toward the horizontal axis; and
   said means responsive to said fourth key input means further includes means for representing a vertical line directed from a plotting point related to the interest payment amount toward a point corresponding to the amount of payment.

4. The financial calculator of claim 3, further comprising:
   judging means for judging whether or not numeral data is entered from said second key input means before said third key input means or said fourth key input means is operated; and wherein
   said confirmation means further includes means for designating a first payment when said judging means judges that there is no numeral data entered from said second input means.

5. The financial calculator of claim 4, wherein said confirmation means further includes:
   means for advancing the designation of a payment to the next one when said third key input means or said fourth key input means is further operated after a payment is designated by said designating means.

6. The financial calculator of claim 4, further comprising:
   fifth key input means for designating a remaining amount of principal; and wherein
   said confirmation means further includes means, in co-operation with said fifth key input means, for displaying a remaining amount of the principal after the designated payment, and for representing vertical lines directed from remaining plotting points after the designated payment toward points corresponding to the amount of payments.

7. The financial calculator of claim 3, wherein:
   said second key input means includes means for entering data designating a payment term; and
   said confirmation means further includes:
      means, in co-operation with said third key input means, for displaying a value of a total amount of interest related to payments designated by the payment term entered from said second key input means, and for representing vertical lines directed from plotting interest points corresponding to the designated payments toward the horizontal axis; and
      means, in co-operation with said fourth key input means, for displaying a value of a total amount of principal related to the payments designated by the payment term entered from said second key input means, and for representing vertical lines directed from plotting interest points corresponding to the designated payments toward points corresponding to the amount of payments.

8. The financial calculator of claim 1, further comprising:
   fifth key input means for designating a remaining amount of principal; and wherein
   said confirmation means further includes means, in co-operation with said fifth key input means, for displaying a remaining amount of the principal after the designated payment, and for representing vertical lines directed from remaining plotting points after the designated payment toward points corresponding to the amount of payments.

* * * * *

UNITED STATES PATENT AND TRADEMARK OFFICE
CERTIFICATE OF CORRECTION

PATENT NO. : 5,058,009
DATED : October 15, 1991
INVENTOR(S) : YOSHINO et al

It is certified that error appears in the above-identified patent and that said Letters Patent is hereby corrected as shown below:

Column 11, line 3 (claim 3), before "means" (first occurrence), insert --said--.

Signed and Sealed this

Third Day of August, 1993

Attest:

MICHAEL K. KIRK

Attesting Officer

Acting Commissioner of Patents and Trademarks